(12) United States Patent
Koepke

(10) Patent No.: US 11,162,522 B2
(45) Date of Patent: Nov. 2, 2021

(54) CONNECTOR DEVICE

(71) Applicant: Lawrence V. Koepke, San Jose, CA (US)

(72) Inventor: Lawrence V. Koepke, San Jose, CA (US)

( * ) Notice: Subject to any disclaimer, the term of this patent is extended or adjusted under 35 U.S.C. 154(b) by 0 days.

(21) Appl. No.: 16/996,811

(22) Filed: Aug. 18, 2020

(65) Prior Publication Data
US 2020/0378421 A1    Dec. 3, 2020

Related U.S. Application Data

(63) Continuation of application No. 15/258,641, filed on Sep. 7, 2016, now Pat. No. 10,781,838.

(51) Int. Cl.
*F16B 7/04* (2006.01)

(52) U.S. Cl.
CPC .......... *F16B 7/0446* (2013.01); *F16B 7/0413* (2013.01)

(58) Field of Classification Search
CPC .. F16B 12/40; Y10T 403/342; Y10T 403/347; Y10T 403/44
See application file for complete search history.

(56) References Cited

U.S. PATENT DOCUMENTS

| | | | | | |
|---|---|---|---|---|---|
| 3,472,539 A | * | 10/1969 | Fenwick | ............... | E04B 1/5831 403/171 |
| 3,603,628 A | * | 9/1971 | Smith | .................... | E06B 3/9684 403/329 |
| 3,711,133 A | * | 1/1973 | Werner | ...................... | F16B 7/00 403/172 |
| 3,726,551 A | * | 4/1973 | Levenberg | ............. | A47B 47/00 403/172 |
| 3,782,054 A | * | 1/1974 | Goss, Jr. | ............... | E06B 3/9682 403/295 |
| 3,799,685 A | * | 3/1974 | Smith | ...................... | F16B 12/40 403/298 |
| 3,851,980 A | * | 12/1974 | Worth | .................... | F16B 7/0446 403/172 |
| 3,883,257 A | * | 5/1975 | Delafield | ........... | A47B 47/0008 403/172 |
| 3,886,710 A | * | 6/1975 | Krause | .................... | A47B 13/12 403/11 |
| 3,932,046 A | * | 1/1976 | Kawazu | ................ | F16B 7/0446 403/172 |
| 3,932,048 A | * | 1/1976 | DuPont | .................... | F16B 12/40 403/225 |
| 4,049,355 A | * | 9/1977 | Kawazu | ........................ | 403/172 |
| 4,099,815 A | * | 7/1978 | Cox | ....................... | A47B 88/941 312/348.2 |
| 4,112,853 A | * | 9/1978 | Tisbo | .................. | A47B 47/0008 108/159 |
| 4,240,765 A | * | 12/1980 | Offterdinger | ......... | E06B 3/9765 29/897.312 |

(Continued)

*Primary Examiner* — Daniel J Wiley
(74) *Attorney, Agent, or Firm* — Douglas L. Weller

(57) ABSTRACT

A connector device for connecting to one or more pipes. The connector device having one or more arms with static and flexible portions. The connector device connects pipes or other types of tubing by inserting the arms of the connector device into the openings of the tubing. A flexibility of the flexible portions enables the connector device to accommodate varying dimensions of inside diameter of pipes or tubing and to provide a friction fit.

15 Claims, 11 Drawing Sheets

(56) References Cited

U.S. PATENT DOCUMENTS

| | | | | |
|---|---|---|---|---|
| 4,516,376 A | * | 5/1985 | King | A47B 47/0008 |
| | | | | 403/171 |
| 4,714,369 A | * | 12/1987 | Souza, Jr. | F16B 7/0446 |
| | | | | 403/190 |
| 5,454,661 A | * | 10/1995 | Litvin | F16B 7/0413 |
| | | | | 403/292 |
| 2008/0169644 A1 | * | 7/2008 | Kim | F16B 12/40 |
| | | | | 285/120.1 |
| 2012/0306194 A1 | * | 12/2012 | Ma | F16B 7/0446 |
| | | | | 285/130.1 |

\* cited by examiner

CONNECTOR DEVICE

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to connecting devices. More particularly, certain embodiments of the invention relate to a connector with one or more flexible portions.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. It is believed that internal connectors for pipes are often too loose or too tight due to manufacturing process variances in the internal diameter of the connected pipes, as many internal connectors do not accommodate these variances. In addition, internal connectors are typically more expensive than currently available external connectors due to the complexity of their manufacture. Thus, external connectors are often used to connect pipes rather than internal connectors. Some may find that external connectors do not produce an aesthetically pleasing junction.

By way of educational background, an aspect of the related technology generally useful to be aware of is that while pipe connectors are currently available for internal insertion in pipes for structural purposes, it is believed that such connectors may not satisfactorily account for the variance in the inside diameters of pipes and tubes and that such connectors may be prohibitively expensive to manufacture. For example, many existing connectors require a multiplicity of parts that may complicate assembly and may require multiple diverse steps of manufacture.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a perspective side view, and FIG. 2B is a diagrammatic front view;

Figure 1:
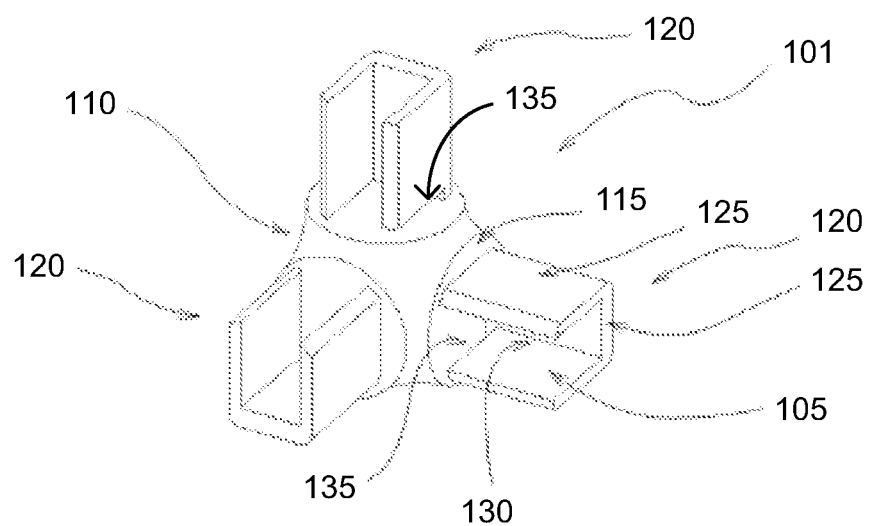
FIG. 1 is a perspective side view of an exemplary connector with flexible portions, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law ?, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003) Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. .sctn.112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to avoid a strict numerical boundary to the specified parameter," see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, are generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction with, some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/ dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

An embodiment of the present invention may provide a connector comprising one or more arms with flexible portions. Some embodiments may be used to connect pipes or other types of tubing by inserting the arms of the connector into the openings of the tubing. In some embodiments the flexibility of the flexible portions may enable the connector to accommodate the varying dimensions of the inside diameter of pipe or tubing to provide a friction fit. Furthermore, some embodiments may be produced in a cost-effective manner.

FIG. 1 is a perspective side view of an exemplary connector 101 with flexible portions 105, in accordance with an embodiment of the present invention. In the present embodiment, connector 101 comprises a core 110 with three base surfaces 115 from which arms 120 extend. Those skilled in the art will readily recognize, in light of and in accordance with the teachings of the present invention, that some embodiments may be implemented with fewer or more arms extending from the core, for example, without limitation, the exemplary embodiments shown in FIGS. 7 through 11. In the present embodiment, base surfaces 115 may have outside diameters that match the outside diameter of a connecting pipe in order to provide a smooth connection between core 110 and the connecting pipe. It is contemplated that some embodiments may not be configured in a manner in which the outside diameter of the base surface matches the outer diameter of the connecting pipe. Furthermore, some embodiments may comprise more or fewer arms extending from the core. In the present embodiment, arms 120 may be U-shaped and each comprise a static projection 125 attached to the base surface and at least one flexible portion 105 attached on the side of the static projection. In some embodiments, a U-shaped arm may comprise two flexible portions attached to one static projection or protrusion where the two flexible portions extend out of each side of the static projection. In the present embodiment, each flexible portion 105 may protrude along a line of attachment 130 with one of static projections 125 and may be unattached at base surface 115, as shown by a gap 135 between flexible portion 105 and base surface 115. The gap allows the flexible portion to bend within the inside walls of the connecting pipe to create a friction fit between the arm and the connecting pipe. Flexible portion 105 is shown being completely unattached to base surface 115; however, it is contemplated that in some embodiments the flexible portion may be connected minimally or partially to the base surface to stiffen the bending of some part of the flexible portion creating a stronger friction fit between the arms and the connecting pipe. For example, without limitation, referring to FIG. 7, the flexible portion may be connected to the base surface for a short distance from the connection of the flexible portion to the static protrusion, and in FIG. 13, the flexible portion may be connected with a thin portion of greater flexibility or of breakability. In the present embodiment, line of attachment 130 may be parallel to the long axis of arm 120. Flexible portions 105 may extend outward farther than static projections 125 such that flexible portions 105 may extend beyond the inner diameter of a connecting pipe. The flexibility of flexible portions 105 may enable flexible portions 105 to bend around line of attachment 130 to accommodate varying inside diameters of connecting pipes while maintaining a friction fit that may hold said pipes firmly to connector 101.

In the present embodiment, connector 101 may be made of various formable materials, including, without limitation, plastics and metals that retain elasticity when bent in order to maintain a friction fit with the interior wall of an inserted pipe. For example, without limitation, connector 101 may be manufactured with plastic materials such as, but not limited to, PVC or ABS to coordinate with common pipe materials. Connector 101 may also be made of other materials, including, but not limited to natural or synthetic rubber materials, wood, composite materials, metals such as aluminum, copper, iron, or steel, etc. It is contemplated that a cost effective method of manufacture for connector 101 may be to use a two-part mold to form connector 101 through casting, injection molding, forming, etc. This two-part mold method of manufacture may be easily performed for connectors with arms extending in one or two axes (single plane). In cases where the connector arms extend in all three axes (two planes), one or both mold halves may comprise one or more cams to create the gap between the flexible portions of the arms and the core. Alternately, this gap may be created by removing material in a post-mold process. It is believed that by using a simple two-part mold, the connector may be manufactured at a lower cost than traditional external connectors and many currently available internal connectors. Furthermore, in many embodiments the connector may be made of a single piece of material. Some embodiments may be manufactured using a multiplicity of suitable methods. For example, without limitation, some embodiments made of plastic materials such as, but not limited to, PLA or ABS may be made using additive (3-D printing) technology. Other embodiments may be made using methods including, without limitation, machining, joining (i.e. welding), casting, forming (i.e. stamping, pressing), etc. Some embodiments may be made of a combination of materials. For example, without limitation, one such embodiment may comprise a wooden core with plastic arms.

Figure 2A:
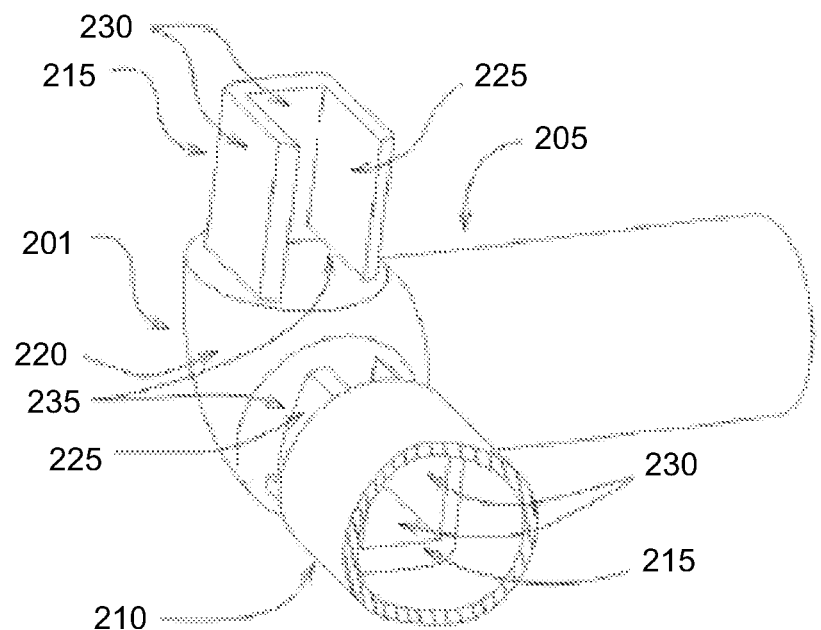
FIGS. 2A and 2B illustrate an exemplary connector connected to pipes, in accordance with an embodiment of the present invention.
Figure 2B:
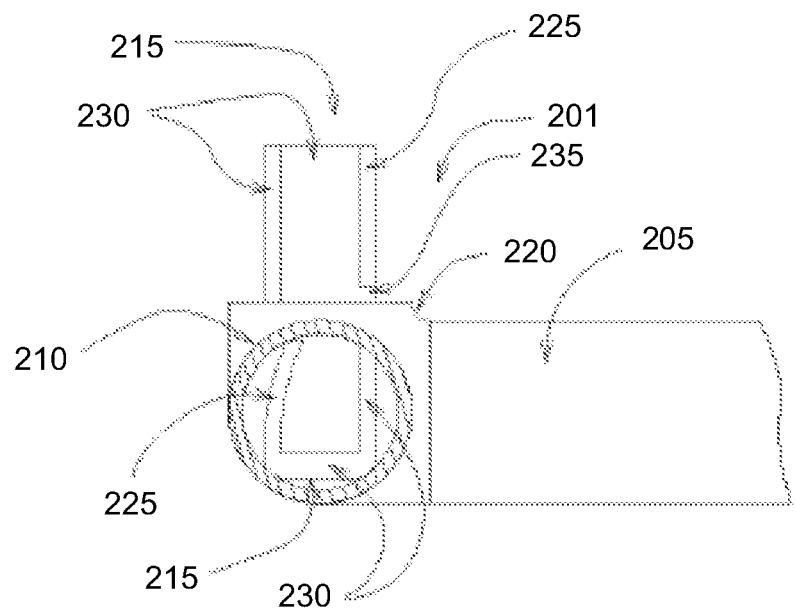

FIGS. 2A and 2B illustrate an exemplary connector 201 connected to pipes 205 and 210, in accordance with an embodiment of the present invention. FIG. 2A is a perspective side view, and FIG. 2B is a diagrammatic front view. In the present embodiment, connector 201 comprises three arms 215. One arm 215 is shown empty. Another arm 215 is shown fully inserted into pipe 205 to illustrate that pipe 205 may smoothly flow into a core 220 of connector 201. It is believed that by inserting arm 215 of connector 201 into pipe 205, the connection between connector 201 and pipe 205 may appear invisible for an aesthetically pleasing connection. A third arm 215 is shown partially inserted into pipe 210 to illustrate how a flexible portion 225 of arm 215 may bend to fit inside pipe 210. Unlike static projections 230 of arm 215, which are connected to core 220, a gap 235 may be left between flexible portion 225 and core 220 to help enable flexible portion 225 to bend. In the present embodiment, flexible portion 225 may extend beyond the inside diameter (ID) of pipe 210. Thus, with flexible portion 225 typically able to bend inwardly and radially around the line of attachment between flexible portion 225 and a static projection 230, connector 201 may accommodate varying inside diameters of pipes, holes and tubes, allowing for the complete insertion of arm 215 when pipes are of smaller diameter than the nominal and yet retaining connection for a secure fit when pipes are of larger diameter than nominal. It is believed that connector 201 may create a secure fit with pipe 210 since flexible portion 225, which may deform inward when inserted into pipe 210, typically maintains constant pressure on the inside wall of pipe 210 while the long edges of static projections 230 may also exert pressure on the inside wall of pipe 210.

In typical use of the present embodiment, up to three pipes may be easily connected in an aesthetically pleasing manner without the need for tools or separate parts for installation. It is contemplated that some embodiments may comprise more or fewer arms to connect virtually any number of pipes. While the embodiments described in the foregoing are shown as internal pipe connectors for structural construction, those skilled in the art will readily recognize, in light of and in accordance with the teachings of the present invention, that some embodiments may be applied in other applications in which two items are to be attached by inserting something into a hole. For example, without limitation, some embodiments may be used as a bookshelf shelf supporter that is inserted into a hole in the side of a bookshelf to hold the shelf up. Other embodiments may be used as a plug to fill an empty hole or as an attachment on the end of a pole or a cap on a pipe. In some applications an adhesive may also be used to make the connection permanent. Yet other embodiments may be used as an adapter to add a wheel into a hole or to add other types of items into a hole such as, but not limited to, handles, light fixtures, hooks, finials, etc. Yet other embodiments may be used to connect various different types of tubing other than round pipes including, without limitation, square tubing, corrugated pipe, flexible tubing, hoses, conduit, etc. Some embodiments may be used in a wide variety of industries and applications including, without limitation, construction, art, home improvement, do-it-yourself (DIY) projects, interior decorating, crafts, toys, etc.

Several alternate arm configurations for connectors with flexible portions extending from one or more inflexible projections are illustrated by way of example in the following descriptions. In these embodiments, the connector core may comprise one or more base surfaces in the shape of the cross-section of a connecting pipe. One or more static projections may extend outwardly from these base surfaces. One or more of these static projections may be connected to one or more flexible portions. The flexible portions may be able to bend as the connector is inserted into a pipe to accommodate variations in the inside diameter of the pipe, creating a friction fit in combination with the static projection(s).

Figure 3:
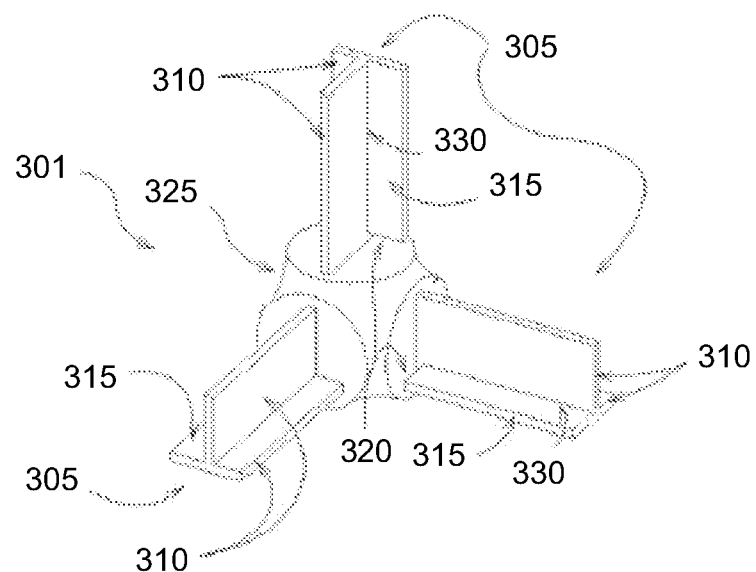
FIG. 3 is a perspective side view of an exemplary three-way connector comprising arms with T-shaped cross sections, in accordance with an embodiment of the present invention.

FIG. 3 is a perspective side view of an exemplary three-way connector 301 comprising arms 305 with T-shaped cross sections, in accordance with an embodiment of the present invention. In the present embodiment, arms 305 each comprise two static projections 310 and one flexible portion 315. Gaps 320 between flexible portions 315 and a core 325 of connector 301 may enable flexible portions 315 to bend along axes of connection 330 between flexible portions 315 and static projections 310. In some alternate embodiments the T-shaped arms may comprise one static projection and two flexible portions.

Figure 4:
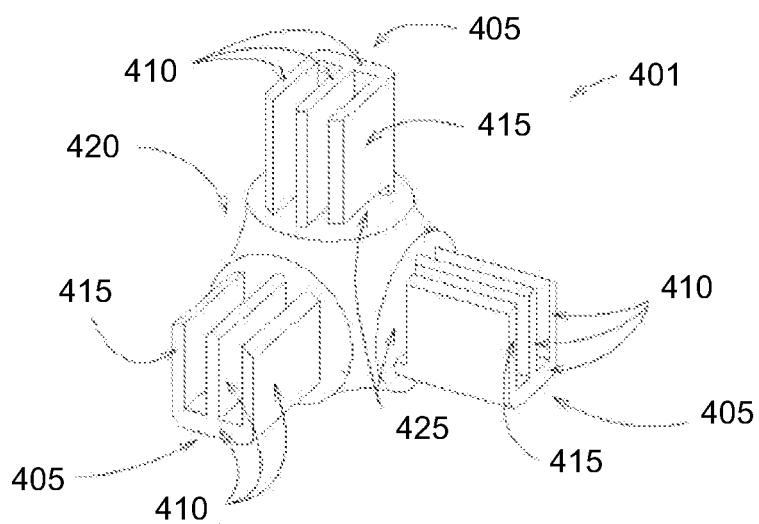
FIG. 4 is a perspective side view of an exemplary three-way connector comprising arms with W-shaped cross sections, in accordance with an embodiment of the present invention.

FIG. 4 is a perspective side view of an exemplary three-way connector 401 comprising arms 405 with W-shaped cross sections, in accordance with an embodiment of the present invention. In the present embodiment, arms 405 each comprise three static projections 410 and one flexible portion 415 separated from a core 420 by gaps 425. It is contemplated that some embodiments may comprise more than one flexible portion per arm.

Figure 5:
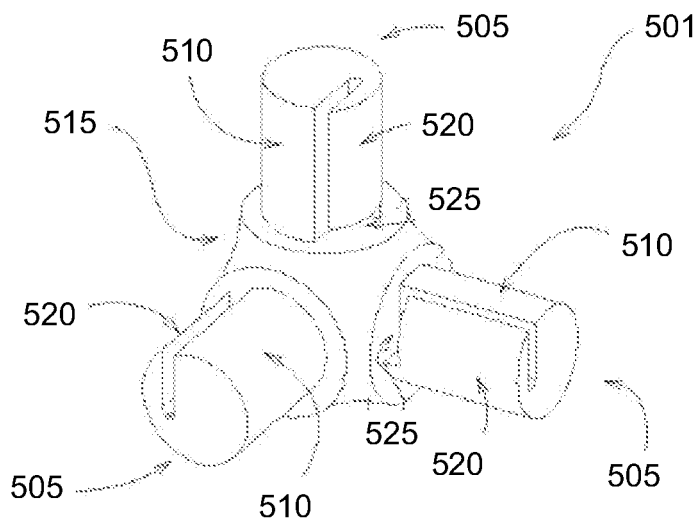
FIG. 5 is perspective side view of an exemplary three-way connector comprising arms with substantially round cross sections, in accordance with an embodiment of the present invention.

FIG. 5 is a perspective side view of an exemplary three-way connector 501 comprising arms 505 with substantially round cross sections, in accordance with an embodiment of the present invention. In the present embodiment, arms 505 each comprise one static projection 510 connected to a core 515 of connector 501 and one flexible portion 520. A gap 525 separates each flexible portion 520 from core 515.

Figure 6:
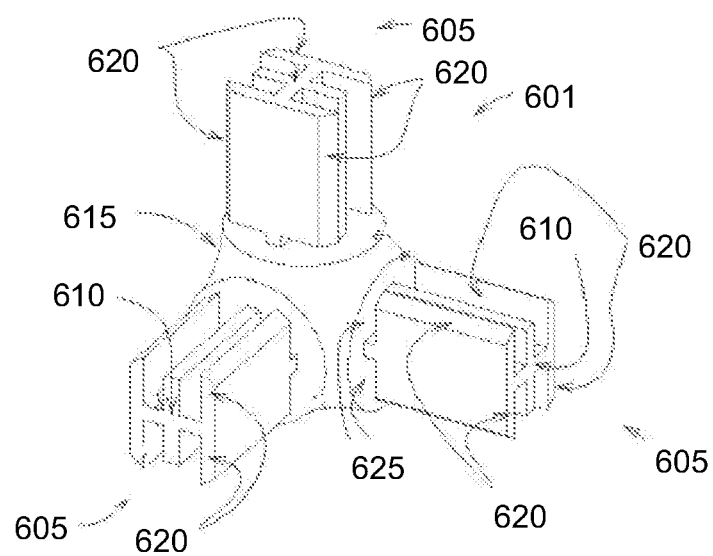
FIG. 6 is a perspective side view of an exemplary three-way connector comprising arms with H-shaped cross sections, in accordance with an embodiment of the present invention

FIG. 6 is a perspective side view of an exemplary three-way connector 601 comprising arms 605 with H-shaped cross sections, in accordance with an embodiment of the present invention. In the present embodiment, arms 605 each comprise one static projection 610 in the shape of a cross connected to a core 615 of connector 601 and four flexible portions 620. Flexible portions may be separated from core 615 by gaps 625.

Figure 7:
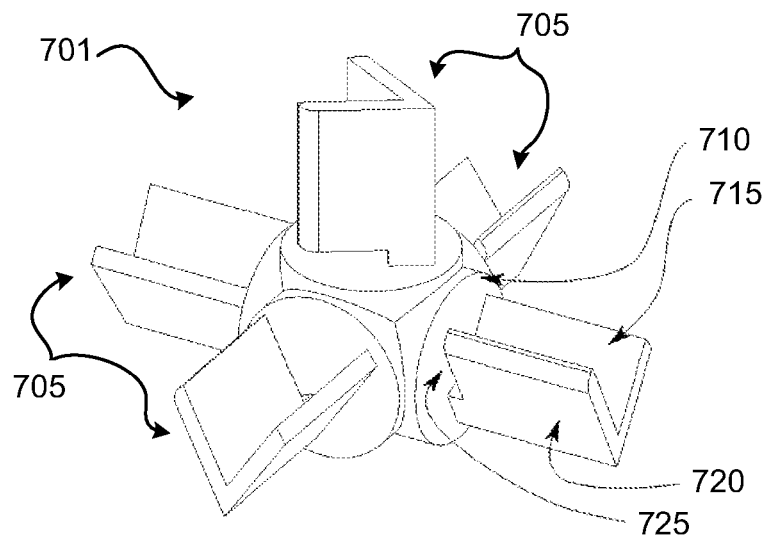
FIG. 7 is a perspective side view of an exemplary five-way connector comprising arms with V-shaped cross sections, in accordance with an embodiment of the present invention.

FIG. 7 is a perspective side view of an exemplary five-way connector 701 comprising arms 705 with V-shaped cross sections, in accordance with an embodiment of the present invention. In the present embodiment, arms 705 protrude from a core 710 and each comprise one static protrusion 715 from which one flexible portion 720 may extend at an angle such that flexible portion 720 may intersect the wall of the pipe to be connected at an angle other than 90.degree. Flexible portion 720 may also be long enough to protrude beyond the space which may be defined by the inside diameter (ID) of the connected pipe so that flexible portion may bend to accommodate the pipe. Flexible portion 720 may be separated from core 710 by a gap 725 which may enable flexible portion 720 to bend inwards as arm 705 is inserted into a pipe, creating a friction fit between the pipe and connector 701.

Figure 8:
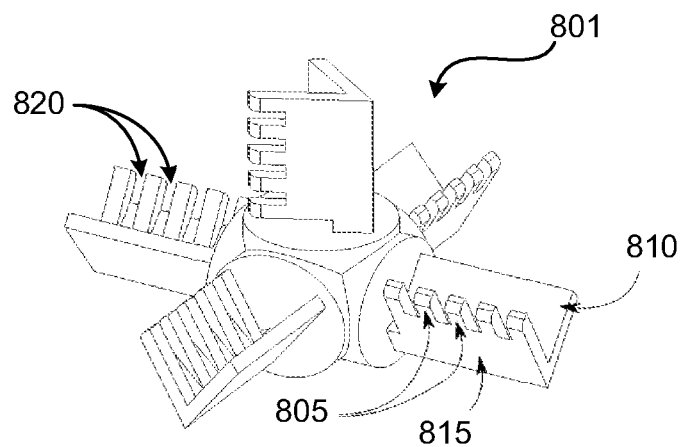
FIG. 8 is a perspective side view of an exemplary five-way connector comprising multiple flexible fingers on each arm, in accordance with an embodiment of the present invention.
Figure 9:
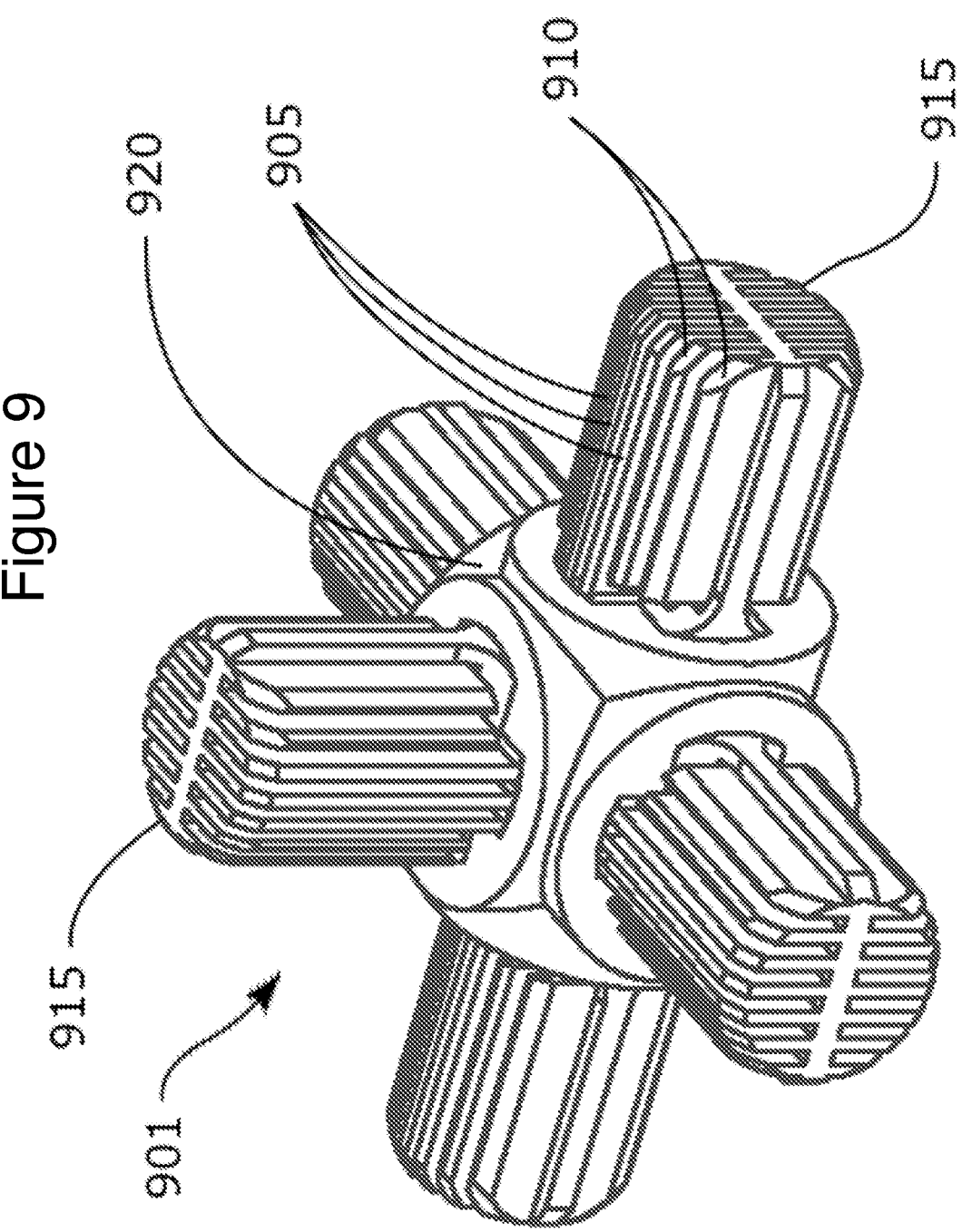
FIG. 9 is a perspective side view of an exemplary five-way connector with a complex arrangement of static protrusions and flexible fins on each arm, in accordance with an embodiment of the present invention.
Figure 10:
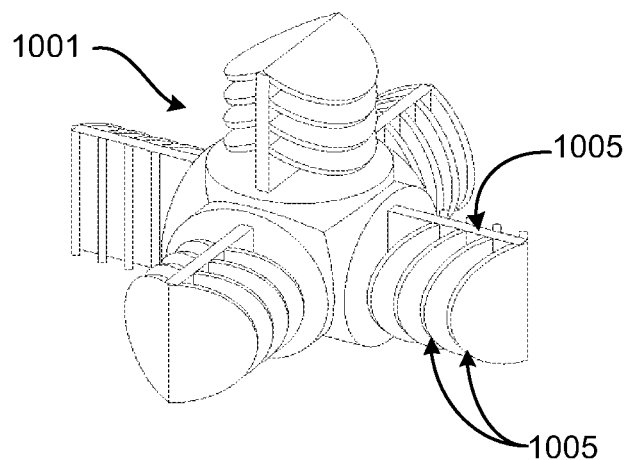
FIG. 10 is a perspective side view of an exemplary five-way connector comprising rounded flexible fins, in accordance with an embodiment of the present invention.

Those skilled in the art will readily recognize, in light of and in accordance with the teachings of the present invention, that the flexible portions of the connector arms do not necessarily need to be a simple plane and may be implemented in a multiplicity of suitable shapes such as, but not limited to, the round arms described by way of example in the foregoing in reference to FIG. 5, a set of multiple projections or fingers as shown by way of example in FIG. 8, static projections comprising multiple fins as shown by way of example in FIG. 9 and FIG. 10, etc.

FIG. 8 is a perspective side view of an exemplary five-way connector 801 comprising multiple flexible fingers 805 on each arm 810, in accordance with an embodiment of the present invention. In the present embodiment, flexible fingers 805 may extend from static projections 815 and may be separated from each other by gaps 820. This may enable flexible fingers 805 to bend independently to accommodate variations in the inside diameter of a connected pipe.

FIG. 9 is a perspective side view of an exemplary five-way connector 901 with a complex arrangement of inflexible protrusions 905 and flexible fins 910 on each arm 915, in accordance with an embodiment of the present invention. In the present embodiment, a core 920 comprises five arms 915, each of which may have a total of eight static protrusions 905 and eight flexible fins 910. Some finned embodiments may be implemented with various different numbers of static protrusions and flexible fins in a multiplicity of suitable configurations. In the present embodiment, connector 901 may be made using mold manufacturing, which may enable connector 901 to be made more inexpensively than many currently available connectors. In addition, connector 901 may be manufactured in various different materials including, without limitation, plastics, metals, wood, composite materials, rubber, etc. In typical use of the present embodiment, connector 901 may be easy to use, as the multiple thin, flexible fins 910 may provide appropriate resistance to bend to adapt to variations in the inside diameter of connected pipes while holding the pipes in place.

FIG. 10 is a perspective side view of an exemplary five-way connector 1001 comprising rounded flexible fins 1005, in accordance with an embodiment of the present invention. In the present embodiment, flexible fins 1005 are connected to static protrusions 1010 at angles substantially perpendicular to the axes of static protrusions 1010 rather than parallel with the axes. The rounded shape of flexible fins 1005 may enable flexible fins 1005 to fit into a pipe being connected while the flexibility of fins 1005 may enable fins to bend in order to accommodate variations in the inside diameter of the pipe.

Figure 11:
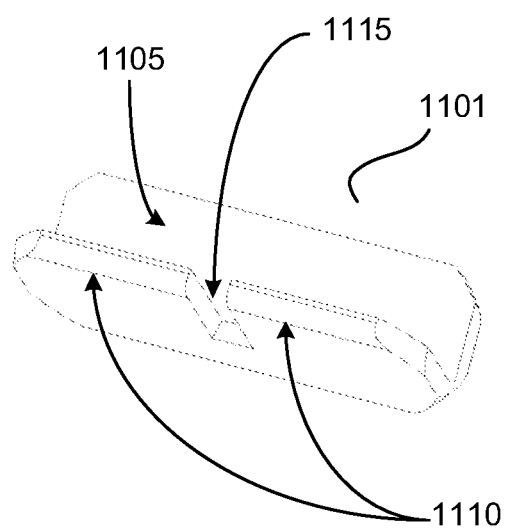
FIG. 11 is a perspective side view of an exemplary two-way connector with a V-shaped cross section, in accordance with an embodiment of the present invention.

FIG. 11 is a perspective side view of an exemplary two-way connector 1101 with a V-shaped cross section, in accordance with an embodiment of the present invention. In the present embodiment, connector 1101 may function as a coupler to connect two pipes together. Connector 1101 comprises one rigid portion 1105 and two flexible portions 1110 separated by a gap 1115. Gap 1115 may enable flexible portions 1110 to bend when inserted into a pipe. It is contemplated that some alternate embodiments may be implemented as two-way connectors with various different cross sections including, without limitation, U-shaped cross sections, T-shaped cross sections, rounded cross sections, finned cross sections, etc. In typical use of the present embodiment, connector 1101 may be inserted into one pipe, with the inserted flexible portion 1110 bending inwards to accommodate variations in the inside diameter of the pipe, leaving the other flexible portion 1110 unbent and extending beyond the inside diameter of the pipe, thereby acting as a stop when connector 1101 is fully inserted into the pipe. As the second pipe is inserted on the exposed end of connector 1101, the second flexible portion 1110 begins to bend at its distal end to accommodate the second pipe, allowing the second pipe to slide along connector 1101 until the two pipes come together, at which point the second flexible portion 1110 may be fully bent along its length, thereby no longer functioning as a stop for the first pipe. At this point, the coupling is complete, typically with no visible exposure of connector 1101. If desired, the pipes can be further attached through a secondary process, such as, but not limited to, gluing or welding.

Figure 12A:
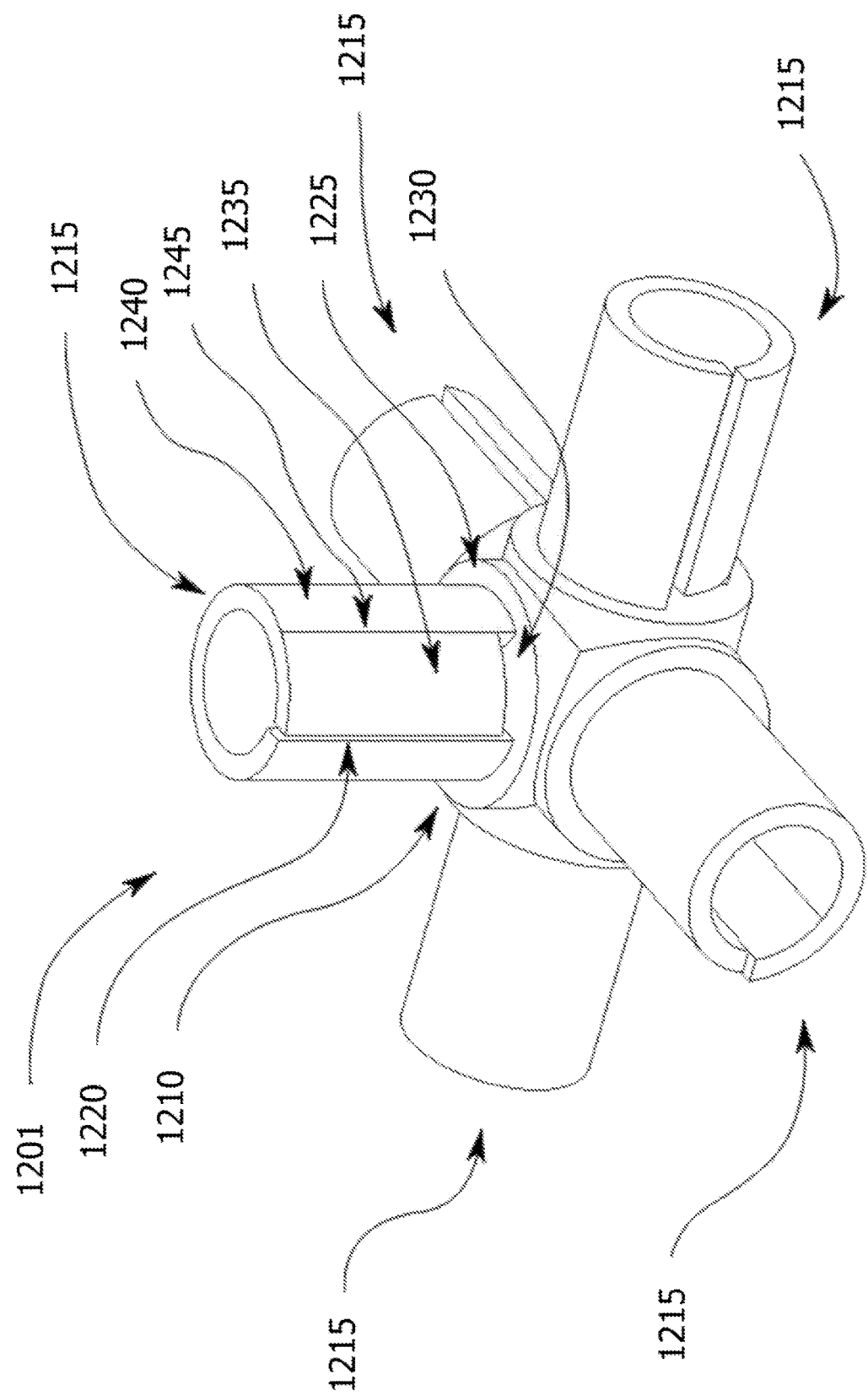
FIGS. 12A and 12B illustrate an exemplary perspective and frontal views respectfully of a 5-way connector.
Figure 12B:
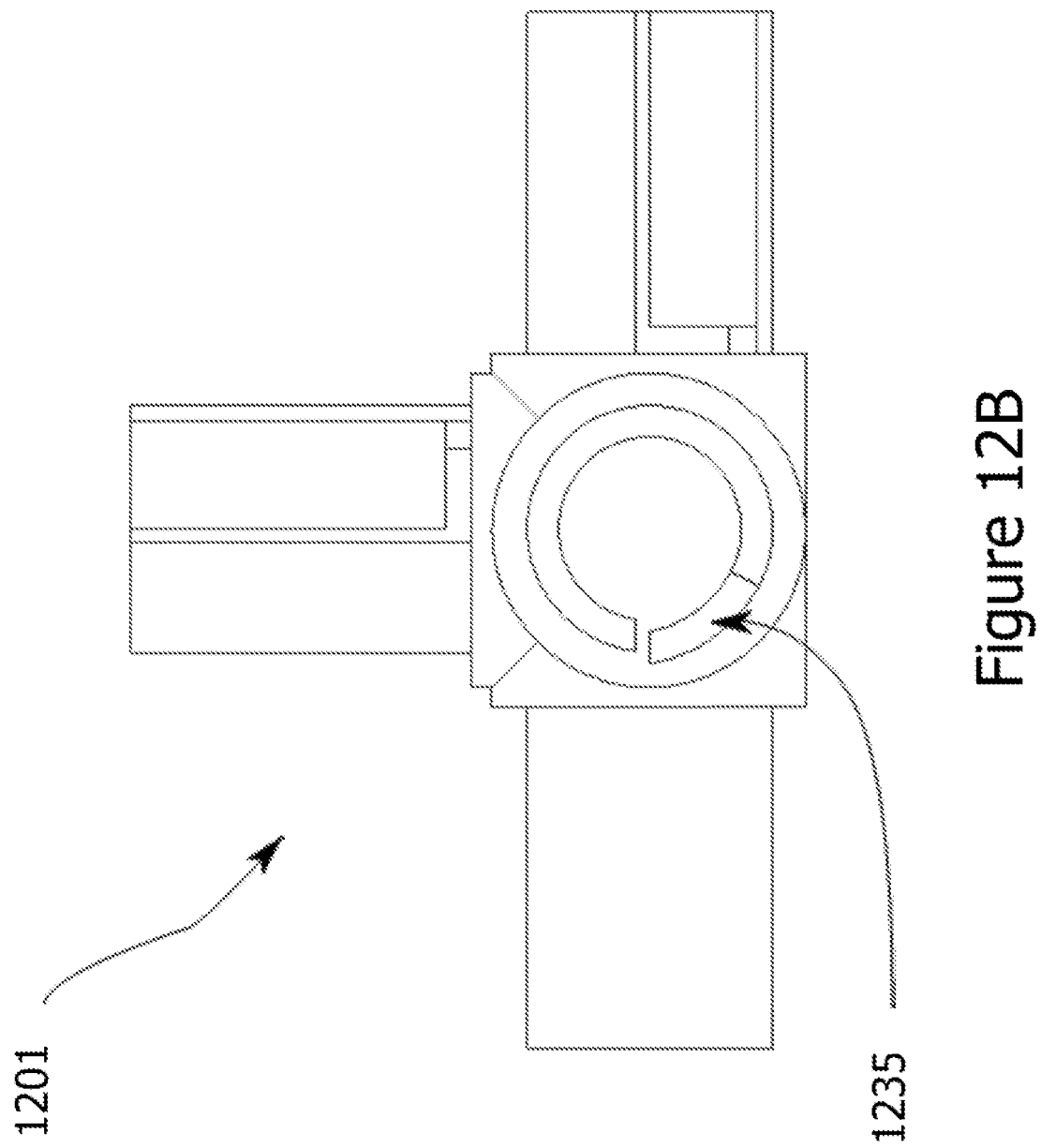

FIG. 12A is a perspective side view of an exemplary five-way connector 1201 with a tubular shaped cross section, in accordance with an embodiment of the present invention. In the present embodiment, a core 1210 comprises five arms 1215, each of which may be comprised of a tubular projection with a gap 1220 along its long axis and portion of the tubular projection being separated from the base 1225 by a gap 1230 creating a flexible projection 1235 which extends from the static portion 1240 along a line of attachment 1245, with said flexible portion extending outward from the center of the tubular projection such that it interferes with the inside of a connection pipe, creating a friction fit. FIG. 12B is a frontal view of this exemplary connector 1201 showing how the flexible portion 1235 extends beyond the inside wall of a connecting pipe to create a friction fit. This example utilizes one tubular projection per arm, but multiple tubular projections are also possible implementations.

Figure 13:
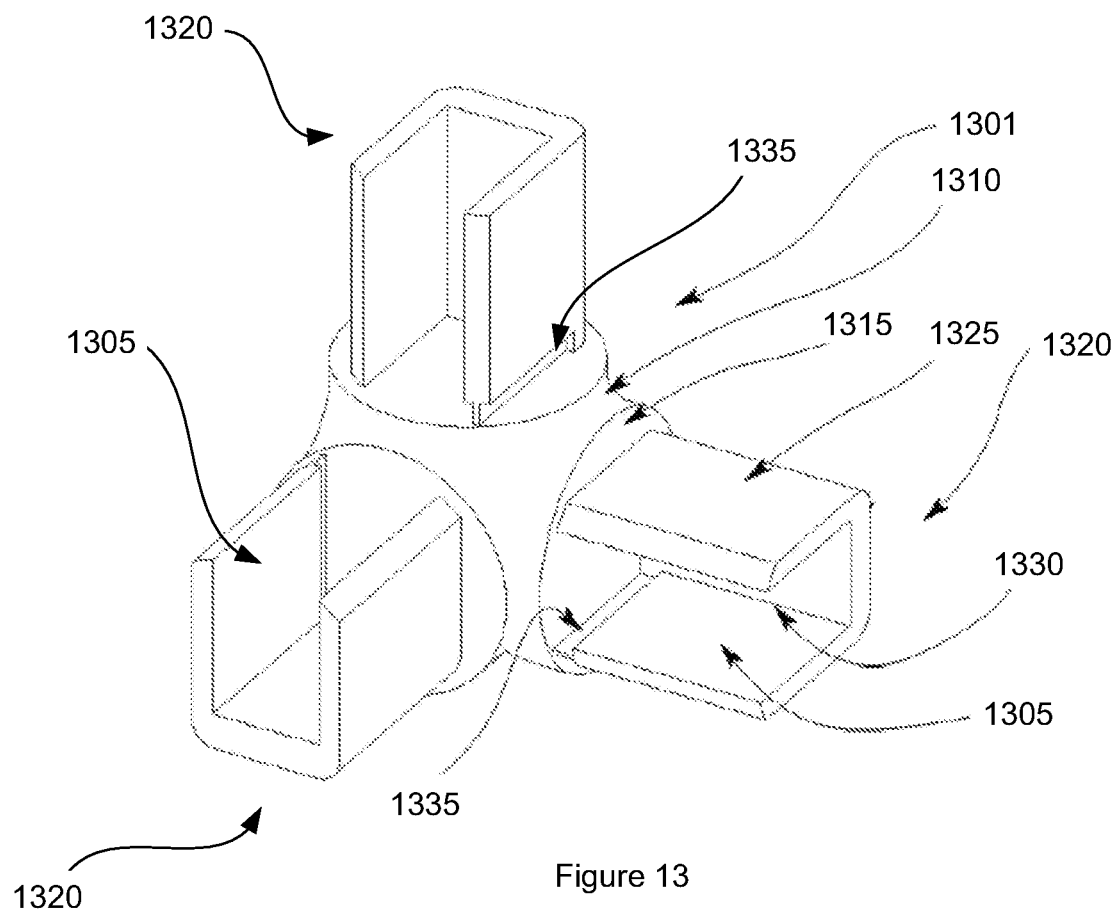
FIG. 13 is a perspective side view of an exemplary connector with thin flexible or breakable portions in lieu of gaps, in accordance with an embodiment of the present invention.

FIG. 13 is a perspective side view of an exemplary connector 1301 with flexible portions 1305, in accordance with an embodiment of the present invention. In the present embodiment, connector 1301 comprises a core 1310 with three base surfaces 1315 from which arms 1320 extend. Arms 1320 may be U-shaped and may each comprise a static projection 1325 attached to a base surface 1315 and at least one flexible portion 1305 attached to static projection 1325. In the present embodiment, each flexible portion 1305 may protrude along a line of attachment 1330 with one of static projections 1325 and may be attached to a base surface 1315 by a thin strip 1335 rather than being disconnected from base surface 1315 as in some of the embodiments described by way of example in the foregoing. Strip 1335 may be made of the same material as the rest of connector 1301 yet made in a thickness that may enable strip 1335 to break upon insertion into a pipe, creating a gap between flexible portion 1305 and base surface 1315, or to flex sufficiently so as to typically enable flexible portion 1305 to perform similarly to a disconnected flexible portion. The flexibility of flexible portions 1305 may enable flexible portions 1305 to bend around lines of attachment 1330 to accommodate varying inside diameters of connecting pipes while maintaining a friction fit that may hold said pipes firmly to connector 1301. In the present embodiment, connector 1301 may be made of various formable materials, including, without limitation, plastics and metals that retain elasticity when bent, natural or synthetic rubber materials, wood, composite materials, a combination of materials, etc. Those skilled in the art will readily recognize, in light of and in accordance with the teachings of the present invention, that the configuration of the strip of material connecting the flexible portion of the connector to the base surface may vary in some embodiments. For example, without limitation, in some embodiments the flexible portion may be connected to the base surface by multiple thin pieces of material separated by gaps to form something like a perforated connection. In other embodiments the strip may be made of a different material than the rest of the connector. In yet other embodiments the strip may extend only part of the way along the flexible portion, the strip may be perforated to facilitate tearing or breaking, the strip may be replaced by a number of posts connecting the base to the flexible portion, and other variations on the strip that perform similarly may be possible.

In typical use of the present embodiment, up to three pipes may be easily connected by connector 1301 in an aesthetically pleasing manner. It is believed that by inserting an arm 1320 of connector 1301 into a pipe or hole, connector 1301 may create a secure fit with the pipe or hole by maintaining pressure on the inside of the pipe or hole. Since thin strip 1335 may typically enable flexible portion 1305 to deform inward by breaking or flexing as arm 1320 is inserted into the pipe or hole, this pressure may be created as flexible portion 1305 pushes against the inside of the pipe or hole while the long edges of static projections 1325 may also exert pressure on the inside wall of the pipe or hole. In some applications an adhesive may also be used to enhance the connection. As with the embodiments previously described by way of example, it is contemplated that some embodiments with flexible portions connected to the base may comprise more or fewer arms to connect virtually any number of pipes or other objects.

The foregoing descriptions dealt mainly with three-way and five-way connectors. However, it is contemplated that some embodiments may be implemented for use as connectors capable of one to many connections. Those embodiments implemented for one connection may be configured to function as an end cap or hole plug. Those skilled in the art will readily recognize, in light of and in accordance with the teachings of the present invention, that some embodiments may comprise a multiplicity of suitable additional or alternate features such as, but not limited to, hollow cores, decorative cores, color coding to indicate size or material, recycle notations, etc.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC.sctn.112 (1), all claims must be supported by sufficient disclosure in the present patent specification, and any material known to those skilled in the art need not be explicitly disclosed. However, 35 USC.sctn.112 (6) requires that structures corresponding to functional limitations interpreted under 35 USC.sctn.112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC.sctn.112 (6) when such corresponding structures are not explicitly disclosed in the foregoing patent specification. Therefore, for any invention element(s)/structure(s) corresponding to functional claim limitation(s), in the below claims interpreted under 35 USC .sctn.112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC.sctn.112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3.sup.rd parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC.sctn.112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC.sctn.112 (6). Applicant(s) note that all the identified documents above which are incorporated by reference to satisfy 35 USC .sctn.112 (6) necessarily have a filing and/or publication date prior to that of the instant application, and thus are valid prior documents to incorporated by reference in the instant application.

Having fully described at least one embodiment of the present invention, other equivalent or alternative methods of implementing a connector with one or more flexible portions according to the present invention will be apparent to those skilled in the art. Various aspects of the invention have been described above by way of illustration, and the specific embodiments disclosed are not intended to limit the invention to the particular forms disclosed. The particular implementation of the connector with one or more flexible portions may vary depending upon the particular context or application. By way of example, and not limitation, the connectors with one or more flexible portions described in the foregoing were principally directed to static connectors implementations; however, similar techniques may instead be applied to connectors that comprise hinged arms or rotating arms to enable the connected pipes to pivot or rotate, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

The invention claimed is:

1. A connector device that connects to a connecting pipe, the connector device comprising:
 a core part comprising:
  a first base surface; and
  a first arm mechanism extending away from the first base surface, the first arm mechanism comprising:
   a static projection attached to the first base surface and extending from the first base surface in a perpendicular direction to the first base surface,
   a first flexible portion extending from a first side of the static projection, the first flexible portion comprising one or more flexible elements, the first flexible portion being configured to extend into an interior portion of the connecting pipe, and
   a second flexible portion extending from a second side of the static projection opposite the first side, the second flexible portion comprising one or more flexible elements, the second flexible portion being configured to extend into the interior portion of the connecting pipe;
  wherein the first flexible portion extends in a perpendicular direction away from the first base surface, the first flexible portion being separated from the first base surface by a first gap so that the first flexible portion does not have direct physical contact with the first base surface, the first gap beginning at the first base surface and extending to the first flexible portion;
  wherein the second flexible portion extends in the perpendicular direction away from the first base surface, the second flexible portion being separated from the first base surface by a second gap so that the second flexible portion does not have direct physical contact with the first base surface, the second gap beginning at the first base surface and extending to the second flexible portion;
  wherein the first base surface extends outside the static projection, the first flexible portion and the second flexible portion so that when the connecting pipe is fully inserted over the static projection, the first flexible portion and the second flexible portion, the connection pipe rests snug against the first base surface where the first base surface extends outside the static projection, the first flexible portion and the second flexible portion;
  wherein the first gap is configured to allow a bending of the first flexible portion, and the second gap is configured to allow a bending of the second flexible portion;
  wherein when the first flexible portion and the second flexible portion are unbent, the first arm mechanism has an outer circumference that is larger than a circumference of the interior portion of the connecting pipe; and
  wherein the bending of the first flexible portion and the second flexible portion allows the first arm mechanism to fit within the interior portion of the connecting pipe.

2. The connector device of claim 1,
 wherein the first arm mechanism additionally comprises:
  a first static portion extending from the first side of the static projection, the first static portion comprising one or more static elements, the first static portion being configured to extend into the interior portion of the connecting pipe, and
  a second static portion extending from the second side of the static projection, the second static portion comprising one or more static elements, the second portion being configured to extend into the interior portion of the connecting pipe;
 wherein the first static portion extends in the perpendicular direction away from the first base surface, the first static portion being connected to the first base surface; and
 wherein the second static portion extends in the perpendicular direction away from the first base surface, the second static portion being connected to the first base surface.

3. The connector device of claim 1,
 wherein the first arm mechanism additionally comprises:
  a first static portion extending from the first side of the static projection, the first static portion comprising one or more static elements, the first static portion being configured to extend into the interior portion of the connecting pipe, and
  a second static portion extending from the second side of the static projection, the second static portion comprising one or more static elements, the second portion being configured to extend into the interior portion of the connecting pipe;
 wherein the first static portion extends in the perpendicular direction away from the first base surface, the first static portion being connected to the first base surface;
 wherein the second static portion extends in the perpendicular direction away from the first base surface, the second static portion being connected to the first base surface;
 wherein the first static portion is located between a first flexible element and a second flexible element of the first flexible portion; and,
 wherein the second static portion is located between a first flexible element and a second flexible element of the second flexible portion.

4. The connector device of claim 1,
 wherein the first arm mechanism additionally comprises:
  a first static portion extending from the first side of the static projection, the first static portion comprising three static elements, the first static portion being configured to extend into the interior portion of the connecting pipe, and
  a second static portion extending from the second side of the static projection, the second static portion comprising three static elements, the second portion being configured to extend into the interior portion of the connecting pipe;
 wherein the first static portion extends in the perpendicular direction away from the first base surface, the first static portion being connected to the first base surface;
 wherein the second static portion extends in the perpendicular direction away from the first base surface, the second static portion being connected to the first base surface;
 wherein the first static portion is located between flexible elements of the first flexible portion with two flexible elements on one side of the first static portion and two flexible elements on another side of the first static portion; and,
 wherein the second static portion is located between flexible elements of the second flexible portion with two flexible elements on one side of the second static portion and two flexible elements on another side of the second static portion.

5. The connector device of claim 1:
wherein an outer diameter of the first base surface is the same as an outer diameter of the connecting pipe;
wherein the first arm mechanism extends away from the first base surface along a first direction; and
wherein the flexible portion is bendable about the first direction.

6. The connector device of claim 1, wherein the connector device is made of a plastic material comprising PVC or ABS.

7. The connector device of claim 1,
wherein the core part further comprises a second base surface and a third base surface;
wherein the device further comprises a second arm mechanism and a third arm mechanism;
wherein the second arm mechanism extends away from the second base surface; and
wherein the third arm mechanism extends away from the third base surface.

8. The connector device of claim 1, wherein the first arm mechanism is configured to fit into a plurality of connecting pipes with a plurality of inner diameters; and wherein a first inner diameter of a first connecting pipe of the plurality of connecting pipes is different from a second inner diameter of a second connecting pipe of the plurality of connecting pipes.

9. The connector device of claim 1, wherein the core part further comprises:
a second base surface perpendicular to the first base surface; and
a third base surface perpendicular to the first base surface and the second base surface; wherein the device further comprises a second arm mechanism and a third arm mechanism; wherein the second arm mechanism extends away from the second base surface; and wherein the third arm mechanism extends away from the third base surface.

10. A connector device that connects together a plurality of connecting pipes comprising:
a plurality of connector portions, with one connector portion for each of the plurality of connecting pipes, each connector portion including:
a base surface; and
an arm mechanism extending away from the base surface, the arm mechanism comprising:
a static projection attached to the first base surface and extending from the first base surface in a perpendicular direction to the first base surface,
a first flexible portion extending from a first side of the static projection, the first flexible portion comprising one or more flexible elements, the first flexible portion being configured to extend into an interior portion of a connecting pipe, and
a second flexible portion extending from a second side of the static projection opposite the first side, the second flexible portion comprising one or more flexible elements, the second flexible portion being configured to extend into the interior portion of the connecting pipe;
wherein the first flexible portion extends in a perpendicular direction away from the first base surface, the first flexible portion being separated from the first base surface by a first gap so that the first flexible portion does not have direct physical contact with the first base surface, the first gap beginning at the first base surface and extending to the first flexible portion;
wherein the second flexible portion extends in the perpendicular direction away from the first base surface, the second flexible portion being separated from the first base surface by a second gap so that the second flexible portion does not have direct physical contact with the first base surface, the second gap beginning at the first base surface and extending to the second flexible portion;
wherein the first base surface extends outside the static projection, the first flexible portion and the second flexible portion so that when the connecting pipe is fully inserted over the static projection, the first flexible portion and the second flexible portion, the connection pipe rests snug against the first base surface where the first base surface extends outside the static projection, the first flexible portion and the second flexible portion;
wherein the first gap is configured to allow a bending of the first flexible portion, and the second gap is configured to allow a bending of the second flexible portion;
wherein when the first flexible portion and the second flexible portion are unbent, the arm mechanism has an outer circumference that is larger than a circumference of the interior portion of the connecting pipe; and
wherein the bending of the first flexible portion and the second flexible portion allows the arm mechanism to fit within the interior portion of the connecting pipe.

11. The connector device of claim 10,
wherein the arm mechanism additionally comprises:
a first static portion extending from the first side of the static projection, the first static portion comprising one or more static elements, the first static portion being configured to extend into the interior portion of the connecting pipe, and
a second static portion extending from the second side of the static projection, the second static portion comprising one or more static elements, the second portion being configured to extend into the interior portion of the connecting pipe;
wherein the first static portion extends in the perpendicular direction away from the first base surface, the first static portion being connected to the first base surface; and
wherein the second static portion extends in the perpendicular direction away from the first base surface, the second static portion being connected to the first base surface.

12. The connector device of claim 10,
wherein the arm mechanism additionally comprises:
a first static portion extending from the first side of the static projection, the first static portion comprising one or more static elements, the first static portion being configured to extend into the interior portion of the connecting pipe, and
a second static portion extending from the second side of the static projection, the second static portion comprising one or more static elements, the second portion being configured to extend into the interior portion of the connecting pipe;
wherein the first static portion extends in the perpendicular direction away from the first base surface, the first static portion being connected to the first base surface;
wherein the second static portion extends in the perpendicular direction away from the first base surface, the second static portion being connected to the first base surface;

wherein the first static portion is located between a first flexible element and a second flexible element of the first flexible portion; and, wherein the second static portion is located between a first flexible element and a second flexible element of the second flexible portion.

13. The connector device of claim 10, wherein the arm mechanism additionally comprises:

a first static portion extending from the first side of the static projection, the first static portion comprising three static elements, the first static portion being configured to extend into the interior portion of the connecting pipe, and a second static portion extending from the second side of the static projection, the second static portion comprising three static elements, the second portion being configured to extend into the interior portion of the connecting pipe;

wherein the first static portion extends in the perpendicular direction away from the first base surface, the first static portion being connected to the first base surface;

wherein the second static portion extends in the perpendicular direction away from the first base surface, the second static portion being connected to the first base surface;

wherein the first static portion is located between flexible elements of the first flexible portion with two flexible elements on one side of the first static portion and two flexible elements on another side of the first static portion; and, wherein the second static portion is located between flexible elements of the second flexible portion with two flexible elements on one side of the second static portion and two flexible elements on another side of the second static portion.

14. The connector device of claim 10:

wherein an outer diameter of the base surface is the same as an outer diameter of the connecting pipe;

wherein the arm mechanism extends away from the base surface along a first direction; and wherein the first flexible portion is bendable about the first direction.

15. The connector device of claim 10, wherein the connector device is made of a plastic material comprising PVC or ABS.

* * * * *